United States Patent [19]

Jones et al.

[11] Patent Number: 4,764,440
[45] Date of Patent: Aug. 16, 1988

[54] LOW TEMPERATURE MOLTEN COMPOSITIONS

[75] Inventors: Steven D. Jones, Brook Park; George E. Blomgren, Lakewood, both of Ohio

[73] Assignee: Eveready Battery Company, St. Louis, Mo.

[21] Appl. No.: 46,010

[22] Filed: May 5, 1987

[51] Int. Cl.$^4$ .................... H01M 6/16; H01M 10/39; H01M 10/40

[52] U.S. Cl. .................... 429/198; 429/199; 204/243 R; 252/182.1

[58] Field of Search .......... 429/16, 103, 112, 194–201; 252/182.1; 204/60–63, 283 R

[56] References Cited

U.S. PATENT DOCUMENTS

| | | | |
|---|---|---|---|
| 4,122,245 | 10/1978 | Nardi et al. | 429/194 |
| 4,160,070 | 7/1979 | Margalit et al. | 429/194 |
| 4,355,086 | 10/1982 | Saathoff et al. | 429/105 |
| 4,463,071 | 7/1984 | Gifford et al. | 429/194 |
| 4,463,072 | 7/1984 | Gifford et al. | 429/194 |
| 4,482,616 | 11/1984 | Connolly et al. | 429/101 |
| 4,520,084 | 5/1985 | Tinker et al. | 429/101 |
| 4,537,843 | 8/1985 | Shishikura et al. | 429/197 |

FOREIGN PATENT DOCUMENTS 30065 2/1985 Japan .
2150740 7/1985 United Kingdom .

OTHER PUBLICATIONS

Wicelinski et al., *J. Electrochemical Society* 1987, vol. 134 pp. 262–263.
Wilkes et al., *Journal of Inorganic Chemistry*, 1982, vol. 21, pp. 1263–1264.
Wilkes et al., Seiler Research Laboratory Report, FJ SRL TR 82-002, 1982 "Selection of Cations for Ambient Temperature Choroaluminate Molten Salts using MNPO Molecular Orbital Calculations".

*Primary Examiner*—Aaron Weisstuch
*Attorney, Agent, or Firm*—Robert W. Welsh

[57] ABSTRACT

Low temperature molten compositions comprised of a mixture of a metal halide, such as aluminum trichloride, and a hydrocarbyl-saturated onium salt, such as trimethylphenylammonium chloride, are useful as electrolytes in electrochemical cells.

30 Claims, No Drawings

LOW TEMPERATURE MOLTEN COMPOSITIONS

BACKGROUND OF THE INVENTION

This invention relates to compositions which are molten at low temperatures; and specifically to such compositions which are useful as electrolyte compositions.

A class of molten compositions which is of special interest is the class of fused salt compositions which are molten at low temperature and are useful as electrolytes. Such molten compositions are mixtures of components which are liquid at temperatures below the individual melting points of the components. The mixtures can form molten compositions simultaneously upon contacting the components together, or after heating and subsequent cooling.

The fused salt compositions are useful as electrolytes in batteries, photoelectrochemical cells, electrorefining and electroplating. Examples of low temperature molten fused salts are the chloroaluminate salts discussed by Wilkes, J. S., et al; in *J. Inorg. Chem.*, Vol 21, 1263–1264, 1982. Alkyl imidazolium or pyridinium salts are mixed with aluminum trichloride (AlCl$_3$) to form the fused chloroaluminate salts. Also chlorogallate salts made from gallium trichloride and methylethylimidazolium chloride are discussed in Wicelinski et al, "Low Temperature Chlorogallate Molten Salt Systems," *J. Electrochemical Soc.*, Vol. 134, 262–263, 1987. The use of the fused salts of 1-alkylpyridinium chloride and aluminum trichloride as electrolytes is discussed in U.S. Pat. No. 4,122,245. Other patents which discuss the use of fused salts from aluminum trichloride and alkylimidazolium halides as electrolytes are U.S. Pat. Nos. 4,463,071; 4,463,072 and Great Britain patent application GB No. 2,150,740A. Unfortunately, the alkylimidazolium salts are difficult to prepare, and the alkyl pyridinium salts are too easily reduced in an electrochemical cell system.

In view of the disadvantages of known compositions, it would be desirable to have fused salt compositions which would not be difficult to prepare and which would be useful as electrolytes in electrochemical cells.

SUMMARY OF THE INVENTION

This invention is a low temperature molten composition comprising a mixture of a metal halide and a hydrocarbyl-saturated onium salt, wherein at least one of the hydrocarbyl groups is an aromatic hydrocarbyl group.

In another aspect this invention is an electrochemical cell comprising an anode, a cathode, a separator and a low temperature molten electrolyte composition comprising a mixture of a metal halide and a hydrocarbyl-saturated onium salt, wherein at least one of the hydrocarbyl groups is an aromatic hydrocarbyl group.

The compositions of this invention provide fused salt low temperature molten compositions which are useful as electrolytes in batteries, electrorefining processes, and electrowinning processes.

DETAILED DESCRIPTION OF THE INVENTION

The low temperature molten compositions of this invention can be referred to as fused salt compositions, or ionic aprotic solvents. By "low temperature molten" is meant that the compositions are in liquid form below about 100° C. at standard pressure. Preferably, the molten composition is in liquid form below about 6° C., and more preferably below about 23° C. at standard pressure.

The metal halides useful in this invention are those compounds which can form anions in the presence of the anion from the hydrocarbyl-saturated onium salt. Preferred metal halides are covalently bonded metal halides. Especially preferred metals are selected from the group comprising aluminum, gallium, and indium with aluminum being most preferred. The corresponding most preferred halide is chloride and therefore, the most preferred metal halide is aluminum trichloride. This compound is most preferred because it is readily available and can form the polynuclear ion Al$_2$Cl$_7^-$. Furthermore, the molten compositions comprising this polynuclear ion are useful in secondary electrochemical cells.

The hydrocarbyl-saturated onium salts useful in this invention have a hydrocarbyl-substituted onium cation. "Hydrocarbyl-saturated" means that the onium cation is substituted entirely with hydrocarbyl groups, i.e. groups comprising carbon and hydrogen, such as alkyl or alkenyl groups. The hydrocarbyl groups can be substituted with other groups such as a halogen. However such further substitution can undesirably increase the size of the group, and correspondingly increase the viscosity and decrease the conductivity of the melt. Therefore, it is highly desirable that the hydrocarbyl groups be comprised of carbon and hydrogen groups exclusively. At least one of the hydrocarbyl groups is an aromatic hydrocarbyl group. This aromatic group can also be substituted with components other than carbon and hydrogen, although the most preferred aromatic hydrocarbyl group is composed exclusively of carbon and hydrogen. Although the onium salt can be substituted with more than one aromatic hydrocarbyl group, one is highly preferred because a highly viscous composition with low ionic conductivity at room temperature can otherwise result. Phenyl and benzyl are the most preferred examples of the aromatic hydrocarbyl groups. The remaining hydrocarbyl groups are preferably short chain alkyl groups of from 1 to 4 carbon atoms. Most preferably, these groups are methyl or ethyl groups. Such short chains are preferred because they form the least viscous or the most conductive melts.

By "onium" is meant those compounds which can form quaternary or ternary cations. Examples of preferred onium cations are ammonium, phosphonium, arsonium, and sulfonium. Ammonium is especially preferred because it can form the least viscous and most electrochemically stable melts.

The anion of the onium salts can form an anion with the metal halide. Examples of preferred anions are simple halides, such as chloride, bromide, and iodide; and complex halogen-containing ions such as BF$_4^-$, PF$_6^-$, and AsF$_6^-$. More preferably, the simple halides are employed.

The particular anion will vary according to the specific onium cation and the metal halide which are employed. When ammonium is employed as the cation, and aluminum trichloride is employed as the metal halide, chloride is the most preferred anion for the onium salt. In descending order of preference, chloride is followed by bromide and then iodide.

The hydrocarbyl-saturated onium salt can generally correspond to the following structural formula:

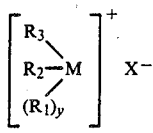

wherein

M is an element which is selected from the group of nitrogen, phosphorous, arsenic, or sulfur;

$R_1$ is independently a short chain alkyl group, which preferably is methyl or ethyl;

$R_2$ is an aromatic hydrocarbyl group, which preferably is phenyl or benzyl; or a short chain alkyl group, which preferably is methyl or ethyl;

$R_3$ is an aromatic hydrocarbyl group, which preferably is phenyl or benzyl;

X is an anion which preferably is a halide or halogen-containing complex ion; and y is 1 when M is sulfur; and 2, when M is nitrogen, phosphorous, or arsenic.

The preferred hydrocarbyl-saturated onium salts are substituted with short chain alkyl groups. The most preferred configuration for the hydrocarbyl-saturated onium salt has methyl groups for $R_1$ in both occurrences and for $R_2$, and a phenyl group for $R_3$.

The most preferred hydrocarbyl saturated onium salt is trimethylphenylammonium chloride which corresponds to the structure:

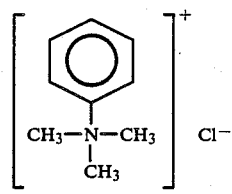

Examples of other preferred hydrocarbyl-saturated onium salts are triethylphenylammonium iodide, trimethylbenzylammonium chloride, dimethylethyl benzyl ammonium chloride, triethyl benzyl ammonium chloride, and methyldiphenylsulfonium tetrafluoroborate. Trimethylphenylammonium chloride is most preferred because its melts exhibit the highest conductivity at about 23° C. These salts are readily commercially available.

The mole ratio of hydrocarbyl-saturated onium salt to metal halide can range from about 2:1 to about 1:2. Preferably, the composition comprises a mole ratio of onium salt to metal halide of about 1:1 to about 1:2. In a highly preferred embodiment, the low temperature molten composition of this invention consists essentially of the metal halide and the hydrocarbyl-saturated onium salt.

Specifically, the most preferred low temperature molten composition is a mixture consisting essentially of a mole ratio of trimethylphenylammonium chloride to aluminum trichloride of about 1:2. Such a melt is especially useful in secondary cells, because it can both plate and strip aluminum.

Typically, the metal halide and hydrocarbyl-saturated onium salt are solids at low temperature i.e. below about 100° C. at standard pressure. For example, the melting point for trimethylphenyl ammonium chloride is about 237° C., and the melting point of $AlCl_3$ is 183° C. After mixing the two solids together, the mixture can be heated until the mixture becomes a liquid. Upon cooling, the mixture remains a liquid al low temperature i.e. below about 100° C. preferably below about 60° C. and more preferably below about 23° C.

The low temperature molten compositions are useful as electrolytes in electrochemical cells, electrolysis, electrowinning and electrorefining processes. In such processes, an anode, a cathode, and a separator can be employed along with the electrolyte. Although the most preferred embodiment of the invention is a mixture which consists essentially of the metal halide and hydrocarbyl-saturated onium salt it may be desirable to employ additional compounds with the molten compositions when using such compositions as electrolytes. For example, it may be desirable to employ a solvent with the molten composition to reduce the viscosity of the composition. Preferably, an inert organic solvent, such as benzene, can be employed. Also, other compounds can be employed to control the formation of substances on the electrodes.

Materials which are the same as or less active than the metal of the metal halide on the emf scale can be employed as the anode. For example, when employing aluminum trichloride, aluminum metal or materials which are less active relative to aluminum on the emf scale can be employed as the anode. Polymers with conjugated backbones, such as polyacetylene, are also suitable.

Any electrochemically reducible material which does not chemically react with the electrolyte can be employed as the cathode. Examples of suitable active cathode materials are manganese dioxide, polymers with conjugated backbones such as polyacetylene, $TiS_2$, $MoS_3$, $Mo_6Se_6$, $SeO_2$, $PbO_2$ and $V_2O_5$. A conductive agent such as carbon or graphite and a suitable binder, for example, polytetrafluoroethylene, can be mixed with the active cathode material if desired.

Suitable separator materials are ionically permeable but yet chemically nonreactive with the cell components. Examples are glass fiber mats and porous plastics such as porous polyethylene.

The electrochemical cells can be prepared using the low temperature molten compositions of this invention as electrolytes by following conventional electrochemical cell manufacturing techniques. For example, the anode and cathode are assembled along with a suitable separator, and then the electrolyte is added to complete the cell.

The low temperature molten compositions of this invention are easily prepared and have a melting point below about 100° C. The chloroaluminate melts of this invention can have a comparable or larger electrochemical window compared to melts made from mixtures of aluminum trichloride and methylethylimidazolium chloride.

The following examples are illustrations and not limitations of the invention.

EXAMPLE 1

Trimethylphenylammonium chloride (available from Kodak) is mixed with aluminum trichloride (available from Fluka Company) in a 1:2 mole ratio. The mixture is heated to 45° C. until the mixture becomes liquid. The molten mixture is cooled to room temperature, and the conductivity is determined to be 3.4 mS/cm. The freezing point is determined to be −75° C.

EXAMPLE 2

Other hydrocarbyl-saturated onium salts are mixed with aluminum trichloride in a 1:2 mole ratio to form low temperature molten mixtures. The conductivities are determined at about 23° C., and the results are provided in Table 1.

TABLE 1

| Hydrocarbyl-Saturated Onium Salt | Conductivity (mS/cm) |
|---|---|
| a. Triethylphenylammonium iodide | 1.29 |
| b. Trimethylbenzylammonium chloride | 1.46 |
| c. Dimethylethylbenzylammonium chloride | 0.63 |
| d. Triethylbenzylammonium chloride | 0.32 |
| e. Methyldiphenylsulfonium tetrafluoroborate | 0.76 |

EXAMPLE 3

An electrochemical cell is made by placing 0.01 g of aluminum as an anode, a 1 g mixture of 73 wt. % $MnO_2$, 20% graphite and 7% Teflon binder as the cathode and a glass fiber separator in a stainless steel container. The molten mixture prepared in Example 1 is employed as the electrolyte, and 1.5 ml are added to the cell. The cell is discharged at 100 microamperes/$cm^2$ for 570 minutes to 0 volts.

Table II contains the data from this discharge.

TABLE II

| Minutes | Cell Voltage (CCV) |
|---|---|
| 100 | 1.75 |
| 200 | 1.7 |
| 300 | 1.7 |
| 400 | 1.65 |
| 450 | 1.65 |
| 500 | 1.6 |
| 550 | 0.9 |
| 570 | 0 |

What is claimed is:

1. A low temperature molten composition comprising a mixture of a metal halide and a hydrocarbyl-saturated onium salt, wherein at least one of the hydrocarbyl groups is an aromatic hydrocarbyl group.

2. The composition of claim 1, wherein the metal halide is a covalently bonded metal halide.

3. The composition of claim 2, wherein the metal of the metal halide is selected from the group comprised of aluminum, gallium, and indium.

4. The composition of claim 3, wherein the metal halide is aluminum trichloride.

5. The composition of claim 4, wherein the hydrocarbyl-saturated onium salt is trimethylphenylammonium chloride.

6. The composition of claim 5, which consists essentially of a mole ratio of trimethylphenylammonium chloride to aluminum trichloride of 1:2.

7. The composition of claim 1, wherein the hydrocarbyl-saturated onium salt corresponds to the structural formula:

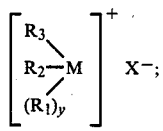

wherein

M is an element selected from the group of nitrogen, phosphorous, arsenic, or sulfur;
$R_1$ is independently, a short chain alkyl group;
$R_2$ is an aromatic hydrocarbyl group, or a short chain alkyl group;
$R_3$ is an aromatic hydrocarbyl group;
X is a halide or halogen - containing complex ion; and
Y is 1 when M is sulfur, and 2 when M is nitrogen, phosophorous, or arsenic.

8. The composition of claim 7, wherein M is nitrogen, $R_1$ is methyl or ethyl, $R_2$ is methyl of ethyl, $R_3$ is phenyl or benzyl, y is 2, and X is $Cl^-$.

9. The composition of claim 8, wherein the hydrocarbyl-saturated onium salt is trimethylphenylammonium chloride.

10. An electrochemical cell comprising
   (a) an anode,
   (b) a cathode,
   (c) a separator, and
   (d) a low temperature molten electrolyte composition comprising a mixture of a metal halide and an hydrocarbyl-saturated onium salt, wherein at least one of the hydrocarbyl groups is an aromatic hydrocarbyl group.

11. The electrochemical cell of claim 10, wherein the metal halide is a covalently bonded metal halide.

12. The electrochemical cell of claim 11, wherein the metal halide is aluminum trichloride.

13. The electrochemical cell of claim 12, wherein the hydrocarbyl-saturated onium salt is trimethylphenylammonium chloride.

14. The electrochemical cell of claim 13, wherein the electrolyte composition consists essentially of a mole ratio of trimethylphenylammonium chloride to aluminum trichloride of 1:2.

15. The electrochemical cell of claim 14, where in aluminum is employed as the anode.

16. The electrochemical cell of claim 10, wherein the hydrocarbyl-saturated onium salt corresponds to the structural formula:

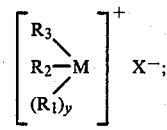

wherein

M is an element selected from the group of nitrogen, phosphorous, arsenic, or sulfur;
$R_1$ is independently, a short chain alkyl group;
$R_2$ is an aromatic hydrocarbyl group, or a short chain alkyl group;
$R_3$ is an aromatic hydrocarbyl group;
X is a halide or halogen-containing complex ion; and
Y is 1 when is sulfur, and 2 when M is nitrogen, phosophorous, or arsenic.

17. The electrochemical cell of claim 16, wherein M is nitrogen, $R_1$ is methyl or ethyl, $R_2$ is methyl or ethyl, $R_3$ is phenyl or benzyl, y is 2, and X is $Cl^-$.

18. The electrochamical cell of claim 17, wherein the hydrocarbyl-saturated onium salt is trimethylphenylammonium chloride.

19. The electrochemical cell of claim 10, wherein the electrolyte composition is further comprised of an inert organic solvent.

20. The electrochemical cell of claim 19, wherein the inert organic solvent is benzene.

21. An electrochemical cell comprising:
(a) an anode,
(b) a cathode,
(c) a separator, and
(d) a low temperature molten electrolyte composition consisting essentially of a mixture of a metal halide and an hydrocarbyl-saturated onium salt, wherein at least one of the hydrocarbyl groups is an aromatic hydrocarbyl group.

22. The electrochemical cell of claim 21, wherein the metal halide is a covalently bonded metal halide.

23. The electrochemical cell of claim 22, wherein the metal halide is aluminum trichloride.

24. The electrochemical cell of claim 23, wherein the hydrocarbyl-saturated onium salt is trimethylphenylammonium chloride.

25. The electrochemical cell of claim 24, wherein aluminum is employed as the anode.

26. The electrochemical cell of claim 25, wherein the cell is a secondary electrochemical cell.

27. The electrochemical cell of claim 21, wherein the hydrocarbyl-saturated onium salt corresponds to the structural formula:

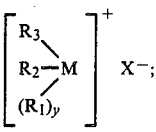

wherein
M is an element selected from the group of nitrogen, phosphorous, arsenic, or sulfur;
$R_1$ is independently, a short chain alkyl group;
$R_2$ is an aromatic hydrocarbyl group, or a short chain alkyl group;
$R_3$ is an aromatic hydrocarbyl group;
X is a halide or halogen-containing complex ion; and
Y is 1 when M is sulfur, and 2 when M is nitrogen, phosophorous, or arsenic.

28. The electrochemical cell of claim 27, wherein M is nitrogen, $R_1$ is methyl or ethyl, $R_2$ is methyl or ethyl, $R_3$ is phenyl or benzyl, y is 2, and X is $Cl^-$.

29. The electrochemical cell of claim 28, wherein the hydrocarbyl-saturated onium salt is trimethylphenylammonium chloride.

30. The electrochemical cell of claim 21, wherein the electrolyte composition is employed without the presence of a solvent.

* * * * *